June 2, 1925.  
G. C. MORRISS  
ARTIFICIAL BAIT  
Filed Dec. 1, 1924

1,540,702

Grover C. Morriss
INVENTOR

BY Victor J. Evans
ATTORNEY

WITNESS: J. T. L. Wright

Patented June 2, 1925.

1,540,702

UNITED STATES PATENT OFFICE.

GROVER CLEVELAND MORRISS, OF AUSTIN, TEXAS.

ARTIFICIAL BAIT.

Application filed December 1, 1924. Serial No. 753,346.

*To all whom it may concern:*

Be it known that I, GROVER C. MORRISS, a citizen of the United States, residing at Austin, in the county of Travis and State of Texas, have invented new and useful Improvements in Artificial Baits, of which the following is a specification.

This invention relates to artificial baits for use by fishermen or anglers and has for its object the provision of a novel bait constructed to resemble a minnow or other small fish, the device having a movably mounted tail which will swing from side to side as the bait is pulled along through the water or as the current acts upon it.

An important object is the provision of a device of this character which is also provided with fins in addition to the movably mounted tail whereby it will have a very realistic appearance and will be most attractive to fish so that they will be tempted to bite upon a suitable hook connected with the bait.

An additional object is the provision of a device of this character which is provided with means for removably holding a hook in position, the advantage being that a hook of one size may be easily removed and replaced by a hook of a different size, depending upon the particular character of the fish to be caught.

A further object is the provision of a device of this character which will be simple and inexpensive in manufacture, easy to use, positive in action, efficient and durable in service, and a general improvement in the art.

With the above and other objects and advantages in view, the invention consists in the details of construction to be hereinafter more fully described and claimed, and illustrated in the accompanying drawings, in which:

Figure 1:
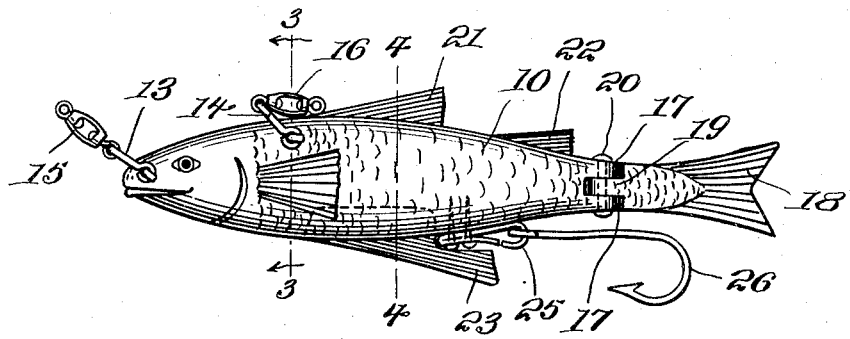
Figure 1 is a side elevation of the device.
Figure 2:
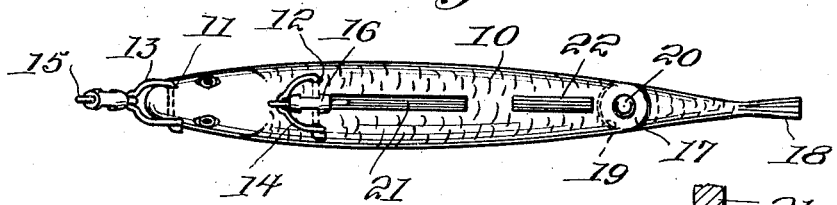
Figure 2 is a top plan view.
Figures 3, 4, 5:
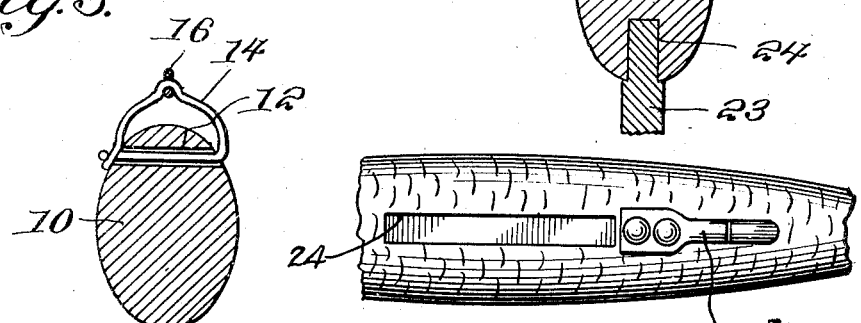
Figure 3 is a cross section on the line 3—3 of Figure 1.
Figure 4 is a cross section on the line 4—4 of Figure 1.
Figure 5 is a fragmentary bottom plan view, the fin being removed and its receiving recess being illustrated.

Referring more particularly to the drawings, I have shown the device as comprising an elongated body 10 formed of any desired material and of any suitable size. This body is shaped to resemble a fish and may be carved, painted or otherwise treated to have a realistic appearance. At its forward and intermediate portions, the body 10 is formed with holes 11 and 12 respectively, within which are engaged securing members 13 and 14 of wire formation carrying swivels 15 and 16 by means of which the device may be attached to a fish line. At its rear end, the body terminates in vertically spaced knuckles or ears 17.

The numeral 18 designates the tail which is of course made to resemble the tail of a fish and which is formed at its forward portion with a knuckle or ear 19 received between the knuckles or ears 17 and pivoted thereto by means of a pin 20 or the like so that this tail portion will be capable of swinging from side to side with respect to the body 10.

Secured or formed upon the top portion of the body are the dorsal fins 21 and 22, and located at the lower side of the body is a fin 23 which might be formed integrally therewith which, in actual practice, may be easily made as a separate piece seated and fastened within a corresponding recess 24 in the lower edge of the body. Naturally, the fins will all act to maintain the device in upright position as it is pulled along in the water or as the current carries it along.

The hook carrying means comprises a snap hook device 25 secured upon the underside of the body at the rear portion of the fin 23 and adapted to have the eye of an ordinary hook 26 engaged therewith whereby this hook will be supported or located beneath the tail portion in such position that the point of the hook is lowermost. Obviously, a hook of any desired size may be engaged with the snap hook 25 depending upon the nature of the fish to be caught.

The device is of course used in exactly the same manner as any other device of this character but it has the great advantage of having the realistic feature of the moving tail which will wiggle back and forth and which will make the device extremely life like and attractive to the fish to be caught.

While I have shown and described the preferred embodiment of the invention, it should be understood that I reserve the right to make such changes in the form, construction and arrangement of parts as will not depart from the spirit of the invention or the scope of the subjoined claim.

Having thus described the invention, I claim:

In a device of the character described, an elongated body formed to resemble a fish, a tail portion pivotally mounted at the rear end of said body and capable of movement sideways, fins on the top and bottom of the body for maintaining the same normally in upright position, and securing members passing through the forward and intermediate portions of the body and carrying swivels for connection with a line, a snap hook secured on the under side of the body near the rear portion thereof and a hook detachably engaged with said snap hook.

In testimony whereof I affix my signature.

GROVER CLEVELAND MORRISS.